March 16, 1965 E. M. BINZONI ETAL 3,173,684
DOCUMENT FEEDER
Filed Oct. 31, 1962 5 Sheets-Sheet 3

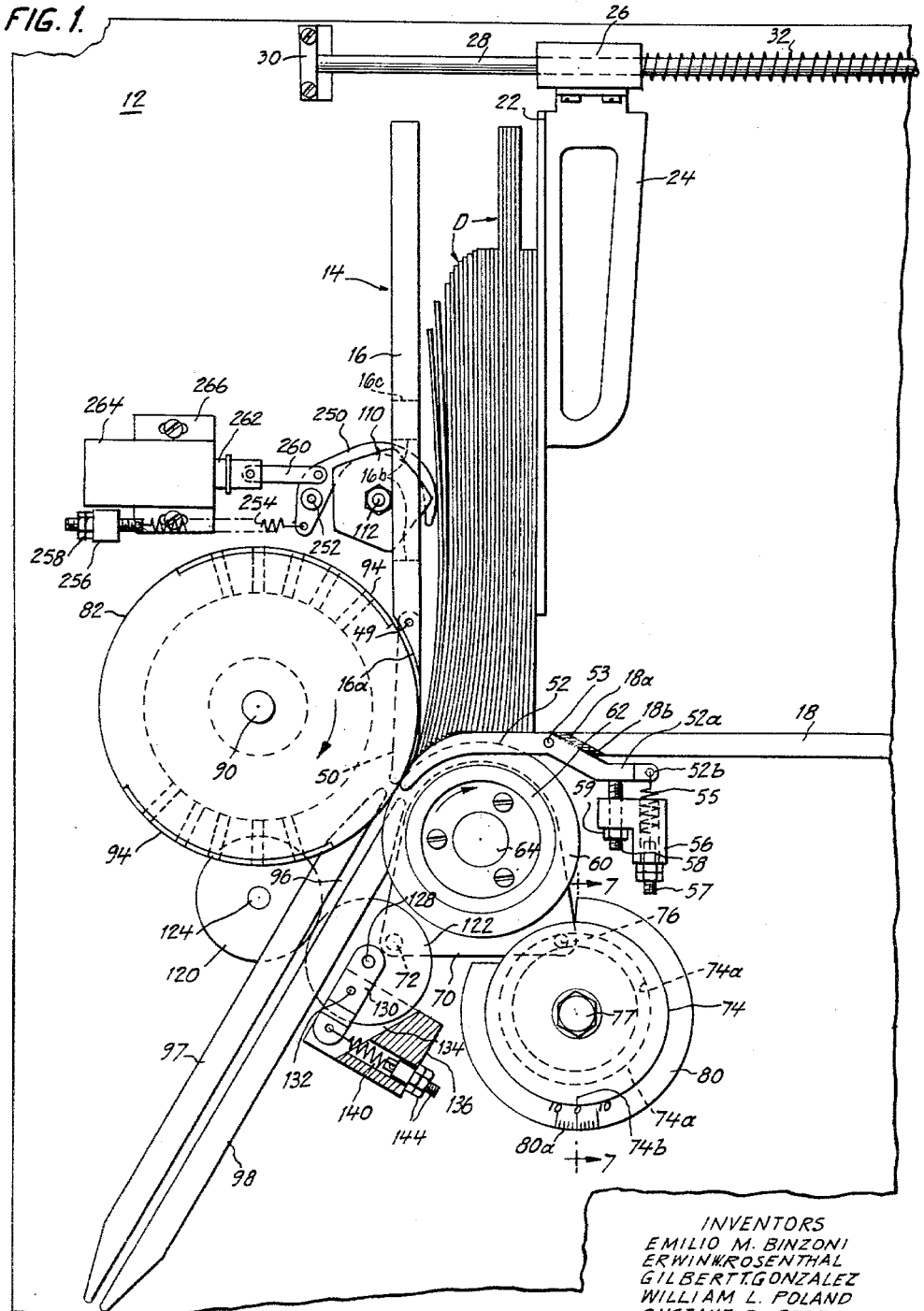

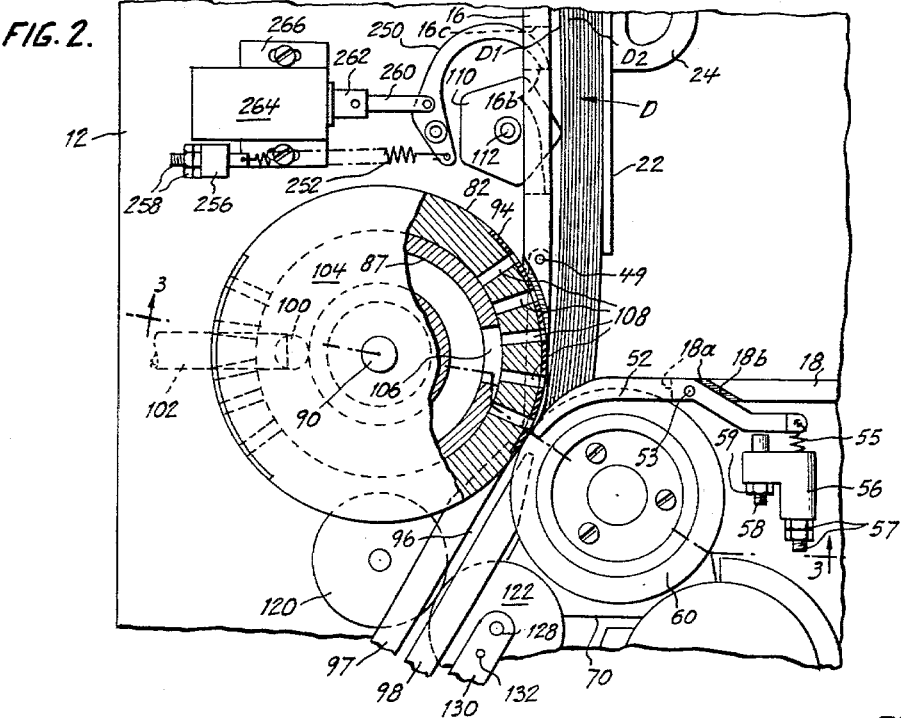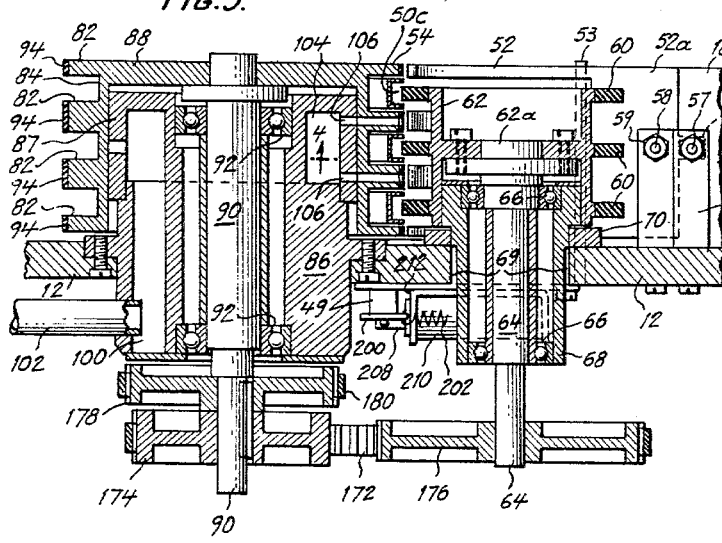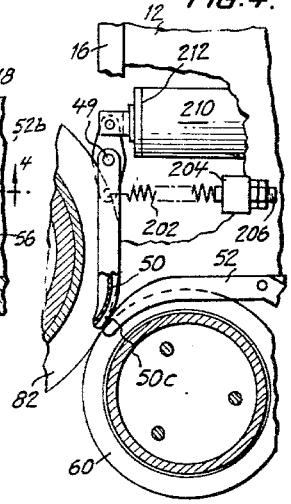

INVENTORS.
EMILIO M. BINZONI
ERWIN W. ROSENTHAL
GILBERT T. GONZALEZ
WILLIAM L. POLAND
GUSTAVE D. CERF
BY Louis Altman
ATTORNEY

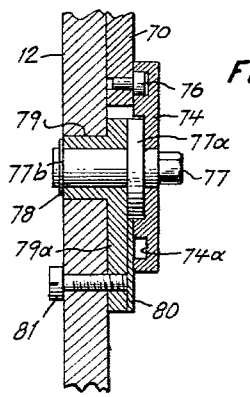
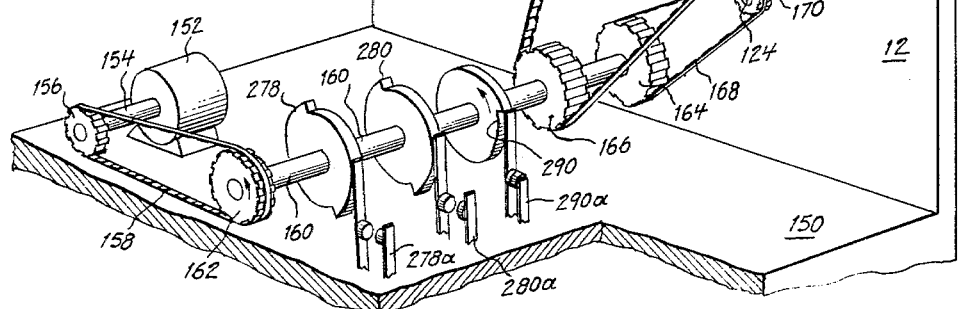
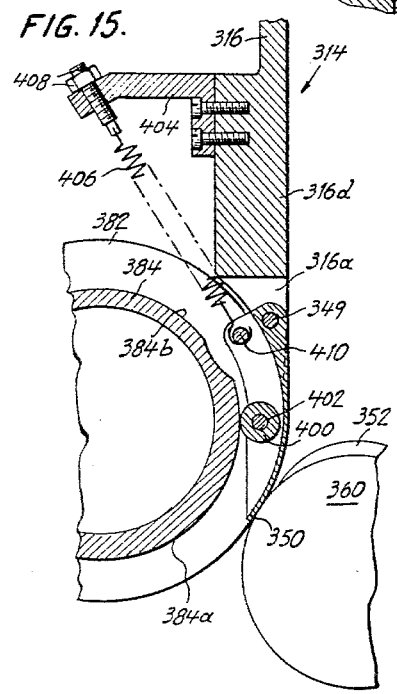
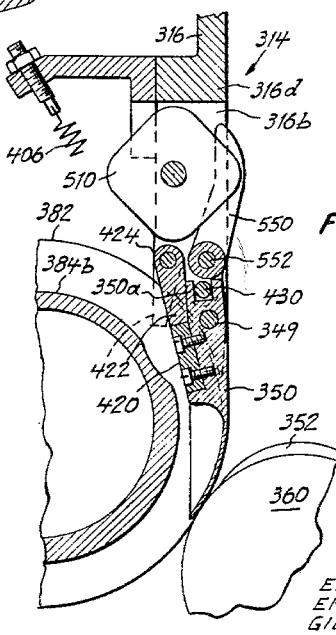

March 16, 1965 E. M. BINZONI ETAL 3,173,684

DOCUMENT FEEDER

Filed Oct. 31, 1962 5 Sheets-Sheet 5

INVENTORS.
EMILIO M. BINZONI
ERWIN N. ROSENTHAL
GILBERT T. GONZALEZ
WILLIAM L. POLAND
GUSTAVE D. CERF

BY Louis Altman
ATTORNEY

United States Patent Office 3,173,684
Patented Mar. 16, 1965

3,173,684
DOCUMENT FEEDER
Emilio M. Binzoni, Norwalk, Erwin W. Rosenthal, East Norwalk, Gilbert T. Gonzalez, Danbury, William L. Poland, Norwalk, and Gustave D. Cerf, East Norwalk, Conn., assignors to Sperry Rand Corporation, New York, N.Y., a corporation of Delaware
Filed Oct. 31, 1962, Ser. No. 234,496
11 Claims. (Cl. 271—57)

This invention relates to document-handling machines such as sorters, and particularly concerns a feeder device for such machines, which picks successive documents from a stack and transfers them to another section of the machine where the sorting or other operation is carried out.

One requirement for document-feeders of this type is that they be able to separate a stack into single documents, without allowing two or more successive documents to stick together and be picked as though they were one. At the same time, however, it is often desirable that the feeder deliver documents to the sorting or other equipment at a rapid rate. A problem then arises, because the more rapidly the documents are picked from the stack, the less reliably they can be separated. In addition, more rapid picking increases the danger that the picking mechanism may rumple or otherwise damage the documents. It is therefore one of the objects of this invention to provide a document feeder which reconciles these conflicting objectives; that is, one which supplies documents at a high feed rate, yet provides reliable separation and also minimizes the danger of mistreating the documents.

Another object of the invention is to provide a document-feeder which affords such precise control that it can interrupt the feeding of documents after only a single document has been delivered, yet can deliver that document at a high feed rate.

It is also an object of the invention to provide a document-feeder the mechanism of which is simple, trouble-free, and may be manufactured inexpensively.

In an illustrative example of a document-feeder embodying this invention there are provided means for initially removing documents from a stack at a relatively slow speed, and means for thereafter accelerating such documents to a relatively high document-sorting speed. Such a device can first pick the documents at a slow speed, thereby securing the advantages of reliable separation and minimizing the risk of document-damage. Then, only after picking and separation have been successfully achieved, are the documents accelerated to speeds consistent with rapid sorting requirements. Thus the operation is divided into two separate stages, and each stage is performed at its own optimum speed to achieve the best results in both.

In order to keep the speed of the entire operation from being limited to the speed of the slower of its two stages, the cyclic rate of initially taking documents from the stack is high, although the surface speed of the mechanism performing this initial stage is low, as just described. Yet the removal of the document picked in any given document-removal cycle is completed before the beginning of the next cycle. This is because the high speed stage of the document's motion begins soon after the beginning of the low speed stage, and thus serves to finish clearing the previous document from the document-removal station rapidly enough for the trailing edge of that document to pass through before it can interfere with the next cycle.

As another feature of this invention, the document-feeding mechanism may be kept running at the speeds necessary to supply documents at a high feed rate. This is so even during a halt in operation. Then when operation is resumed the documents are delivered at a high feed rate again immediately, that is, without first having to accelerate the mechanism. Devices capable of precise control are provided to start and stop the flow of documents. An illustrative document-feeder embodying this feature of the invention comprises a document hopper including a document-edge wall positioned to be alongside the edges of documents in the hopper, and a document-face wall positioned to be alongside an outer most face of documents in the hopper, and terminating short of the document-edge wall. Then a gate is provided which is positioned adjacent the space betwen the document-face and the document-edge walls, and which is mounted for movement to regulate an exit opening for documents between these walls.

There may also be registering means which initially move the documents into position for removal, and a member which is interposed between the registering means and the documents during a halt in operation. In one embodiment according to this invention, the gate and the interposer may be mechanically linked for conjoint operation.

Further features of the invention relate to spring-cushioning and adjustment of the various members between which the documents pass during removal, so as to avoid jamming of the documents.

The device of which the foregoing is a brief summary may be fully appreciated by reference to the following detailed description, in conjunction with the accompanying drawings, which are as follows:

FIG. 1 is a front elevational view, with parts in section, of a document-feeder in accordance with this invention;

FIG. 2 is a similar view of a part of the same document-feeder, with parts broken away to reveal internal structure;

FIG. 3 is a sectional view along the lines 3—3 of FIG. 2;

FIG. 4 is a sectional view along the lines 4—4 of FIG. 3;

FIG. 7 is a fragmentary sectional view along the lines 7—7 of FIG. 1;

FIG. 8 is a perspective view of the rear of the same document-feeder;

Figure 13:
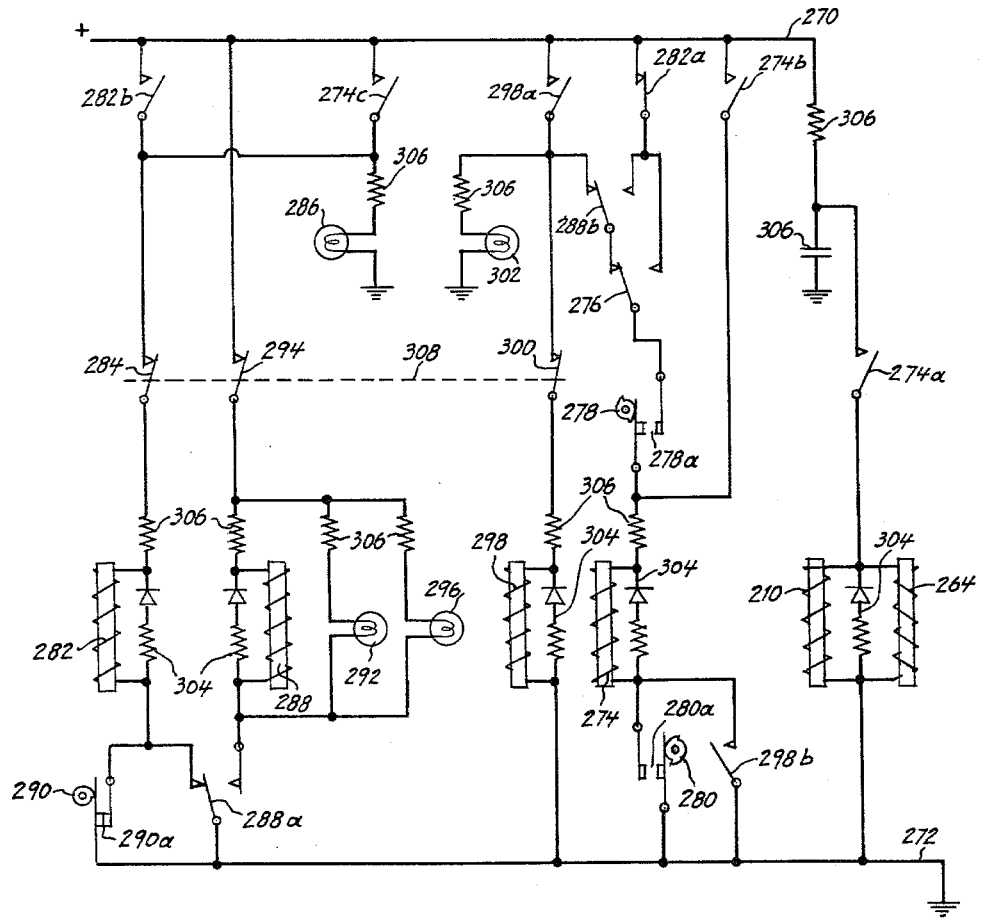
Figure 14:
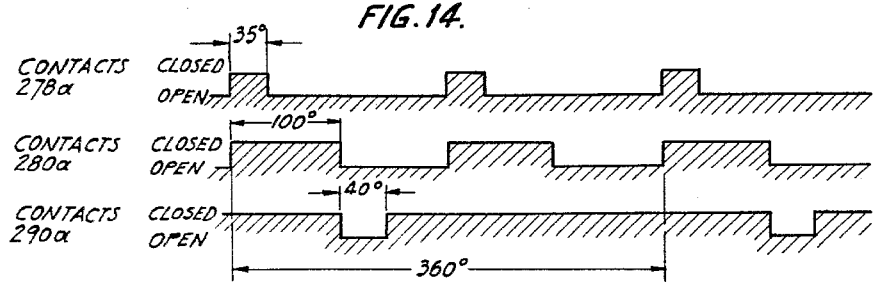

FIGS. 9–12 constitute a series of front elevational views of parts of the same document-feeder, showing successive stages of a typical document-removal cycle;

FIG. 13 is a schematic diagram of a control circuit for the same document-feeder;

FIG. 14 is a timing chart for the cam-operated contacts of FIG. 13;

FIG. 15 is a sectional view similar to FIG. 4, but showing an alternative embodiment of a document-feeder in accordance with this invention; and FIG. 16 is another sectional view, taken along a different plane, of the embodiment of the previous figure.

Referring specifically to the drawings, FIG. 1 shows a document-feeder various parts of which are mounted on a vertical supporting wall 12. These include a document hopper, generally designated 14, which comprises a wall 16 positioned adjacent the outermost face of the documents, generally designated D, in the hopper, and a floor 18 positioned adjacent the lower edges of the documents D. A pusher plate 22 is suspended within the hopper 14 from a depending arm 24. The latter is secured to a slide member 26 which rides along a rail 28 mounted on the supporting wall 12 by brackets, one of which is seen at 30. A feed spring 32 urges the slide member 26, arm 24, and plate 22 toward the wall 16 so that the pusher plate 22 continuously presses the documents D toward that wall. The spring 32 also allows the plate 22 to be moved to accommodate thinner or thicker stacks of documents D, and to compensate for the decrease in the thickness of the stack which occurs continuously as a result of the removal of documents D therefrom during operation of the feeder.

Figure 5:
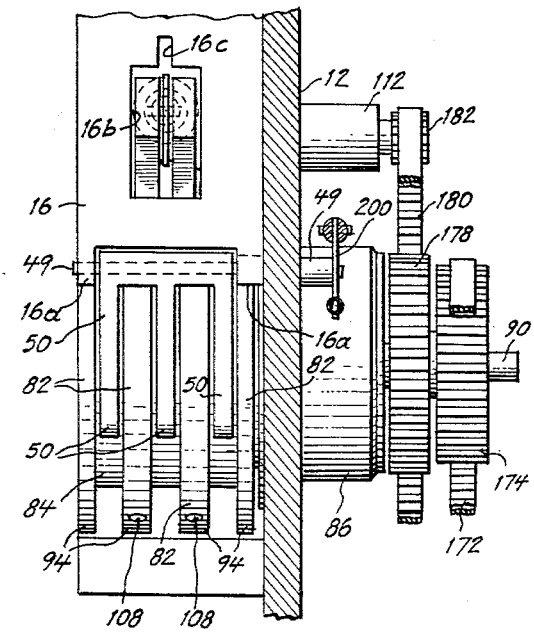
FIG. 5 is a side elevational view of an interior portion of the same document-feeder.

As seen in FIGS. 1 and 5, the hopper wall 16 terminates, above the level of the hopper corner, in a pair of depending gears 16a at either side. A shaft 49 passes rotatably through both ears 16a, and also through to the rear of the supporting wall 12. To this shaft 49, between the ears 16a, is secured a forked gate 50, the depending tines of which serve as a lower extension of the wall 16. The tips of the tines of the gate 50 are formed with a reentrant surface at 50c, FIGS. 3 and 6, for a purpose which will be explained subsequently. Like the wall 16, the hopper floor 18 also terminates at a point short of the hopper corner, beyond which point is an extension consisting of a corner member 52. The part of this member which extends into the hopper corner is forked in the same manner as the gate 50, as may be seen in FIGS. 3 and 6. The tine tips of the gate 50 and corner member 52 are both curved downwardly and outwardly to form a distended corner for the hopper 14. The lower edges of all the outer documents D rest on the corner member 52, those of the outermost documents $D_1$, $D_2$, etc. resting on the downwardly curved outer tip thereof. Thus, these documents tend to slip down into the hopper corner. As they slide down the curve of the member 52, they undergo a preliminary spreading out which facilitates separation.

Figure 6:
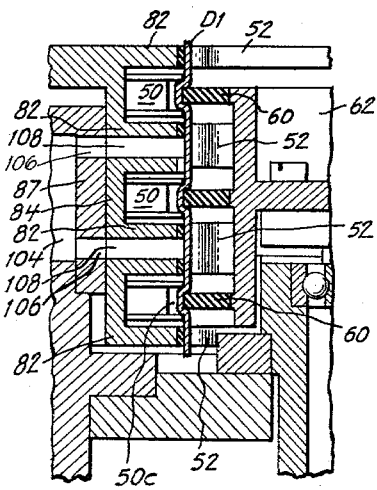
FIG. 6 is an enlarged version of a portion of FIG. 3.

FIGS. 3 and 6 show that alternately interleaved with the four tines of corner member 52 are three spaced counter-rollers 60 in the form of three annular rings mounted on a common sleeve 62. These are formed of a high friction material such as rubber, and protrude between the tine tips of the member 52 at the hopper corner, where they contact the lower edges of the documents D. Rotating clockwise, as seen in FIGS. 1 and 2, they exert a restraining drag on these document edges, tending to prevent the documents D from dropping all the way down. The tines of the gate 50 are opposite respective rollers 60 and may at times be used to press the documents thereagainst to insure a dragging contact, while the re-entrant surfaces 50c embrace the rollers and tend to wrap the documents partially thereabout to enhance the effect. However at other times the respective opposing tine tips of the gate 50 and the counter-rollers 60 are spaced to define between them an exit opening 54 (FIG. 3) through which the documents D pass as they are removed from the hopper 14. It may now be understood that the principal function of the corner member 52 is to protect the documents D from too early contact with the counter-rollers 60, to avoid unnecessary stress on the lower edges of these documents.

In order to move the outermost document $D_1$ down through the exit opening 54 while the counter-rollers 60 restrain the next outermost documents $D_2$ etc., this invention provides removal rollers 82, best seen in FIG. 3 to be formed of four spaced annular flanges formed on a common sleeve 84. The latter is hollow, and has one open end which fits over a spindle 86 bolted to the frame 12. The sleeve 84 and spindle 86 are separated by a bushing 87 which fits tightly about the spindle 86, but over which the sleeve 84 rotates freely. The other end of the sleeve 84 is closed by a disk-shaped web 88 formed thereon. The latter is force-fit on a rotatable shaft 90, which in turn is journaled by means of ball-bearing assemblies 92 within the hollow interior of the spindle 86. As seen in FIGS. 1, 2, and 6, opposite arc segments of the peripheries of each of the four removal rollers 82 bear inserts 94 formed of another high friction material, which may again be rubber, but the coefficient of friction of the material of inserts 94 against paper is preferably higher than the coefficient of friction of the material of counter-rollers 60 against paper.

As best shown by FIGS. 5 and 6, the three tines of the depending curved tip of the gate 50 are alternately interleaved with the four removal rollers 82. The latter, thus protruding between the tines of the gate 50, extend into the exit opening 54 where they contact only the outermost face of just one document, the one then in the position of the outermost document $D_1$. The place of such contact constitutes a document-removal station at which the removal rollers 82, rotating clockwise as seen in FIGS. 1 and 2, are able by means of the friction inserts 94 to exert a downward drag on document $D_1$ which tends to move it down through the exit opening 54. At any one time only the document which is then in the outermost $D_1$ position can be thus contacted and moved. The next outermost documents $D_2$ etc. are at that moment blocked from contact with the removal rollers 82 by the intervening outermost document $D_1$, and thus are not subjected directly to its drag. Any tendency of the outermost document $D_1$ to drag succeeding documents $D_2$ etc. down with it is effectively combatted by the reverse drag on all their lower edges exerted by the counter-rollers 60. In this manner separation of the successive documents $D_1$, $D_2$, etc. is achieved.

The counter-rollers 60, by exerting this reverse drag on all the documents D, are also effective to restrain the outermost documents $D_1$ during the interval, illustrated in FIG. 1, when the next friction insert 94 has not yet made contact therewith. Document removal, then, occurs only upon the passing of a battery of the friction inserts 94, which are aligned on the rollers 82 so that all four in a battery act in synchronism. In this manner the removal rollers 82 operate in a cyclically repeating manner, removing whichever document is in the outermost position $D_1$ each time that a battery of friction inserts 94 passes the document-removal station.

Successive documents thus removed continue along a feed path 96 defined between two sets of confronting rails 97 and 98, each set including a number of rails, only one of which is visible in the profile view of FIG. 1. The upper tips of the rails 97 and 98 at the entrance end of the feed path 96 are aligned with the tips of respective tines of the forked gate 50 and forked corner member 52 respectively, so that the feed path 96 which they define is aligned with the direction of motion of each document D as it passes through the exit opening 54. In addition, each such rail 97 and 98 reaches up close to the removal station, and the rails 97 are alternately interleaved with the removal rollers 82, while the rails 98 are similarly arranged with respect to the counter-rollers 60. As a result, the rails 97 serve to comb the successive documents D off the removal rollers 82 to counteract any possible tendency for the documents to continue to rotate around with the removal rollers 82 and become wrapped thereabout instead of entering the feed path 96.

In some instances machines of this type have been subject to jams caused by a multiplicity of documents becoming pinched in an exit opening which is too small for that many thicknesses of paper. This happens because each document (e.g. $D_1$) as it is removed exerts some drag on those behind it $D_2$ etc., causing them to press toward the exit opening 54. Eventually the lower edges of several documents $D_2$ etc. would become lodged alongside the first document $D_1$ in the exit opening, creating a fixed blockage. For this reason, as seen in FIGS. 1 and 2, near the midpoint of the corner member 52 the tines thereof are pivoted to the hopper floor 18 by a pin 63 passing through these tines and also through short stub projections 18a of the floor 18 alternately interleaved therewith. This permits the corner member 52 to rotate counterclockwise so as to relieve the blockage by allowing the jammed documents to make earlier contact with the counter-rollers 60. Toward the other end of the corner member 52 the tines thereof extend diagonally below the hopper floor 18, the latter being chambered at 18b to provide clearance therefor. The tines then join in an unforked horizontal base section 52a underneath the floor. A link 52b projects from the base section 52a, and to this is secured one end of a tension spring 55, the other end being received within a bore formed in a block 56 mounted on the supporting wall 12, seen in FIGS. 1–3. The spring 55 is tensed against that block by means of a bolt and nut assembly 57 to which the spring is secured. In this manner the spring 55 resiliently biases the member 52 to postpone document contact with the counter-rollers 60, but allows earlier contact in response to the pressure of several documents jammed thereagainst. The block 56 is shaped like an inverted letter L, and the asymmetrical extension thereof is provided with a tapped bore into which is threaded a bolt 58 that bears against the underside of the base section 52a to establish the limit position. This position can be adjusted by turning the bolt 58, after which the latter can be fixed in place by a lock nut 59.

As seen in FIG. 6, the four removal rollers 82 meet the four tines of corner member 52 along one plane, and the three tines of gate member 50 and three counter-rollers 60, which are interleaved respectively therewith, meet along another plane offset somewhat from this first-mentioned plane. Thus counter-rollers 60 and removal rollers 82 mesh slightly with each other, whereby the document therebetween is pressed into a slightly undulated shape so that a better "grip" on that document can be obtained.

However, this closely spaced relationship between the counter-rollers 60 and the removal rollers 82 may need to be varied in one direction or another so as to best accommodate documents of varying thicknesses and thereby reduce the danger of jamming them. Therefore, in accordance with this invention, FIG. 3 shows that the sleeve 62, on which the counter-rollers 60 are mounted, is hollow and formed with a central disk-shaped web 62a which is bolted to the end of a rotatable shaft 64. This in turn is journaled by means of ball bearing assemblies 66 within a hollow spindle 68. The latter passes through an oversize clearance opening 69 formed in the supporting wall 12, and is supported on a carrier plate 70, which slidably overlies the wall 12. As seen in FIG. 1, the plate 70 is roughly triangular in shape. The counter-roller assembly 60–68 is carried near the upper corner, while near one of the lower corners is a pin 72 which pivotably connects the plate 70 to the supporting wall 12 adjacent thereto. Thus, by rotating the plate 70 through a small arc about the pivot pin 72, the counter-roller assembly 60–68 may be moved slightly toward or away from the removal rollers 82, without greatly altering the location of their meeting place within the exit opening 54. In order to provide for sensitive adjustment of the plate 70, there is provided an adjustment disk 74 the inside surface of which is formed with a circular cam track 74a, seen in FIGS. 1 and 7. A cam-follower pin 76 is inserted in a suitable bore formed in the plate 70, and has an enlarged head which rides in the cam track 74a. A bolt 77, which FIG. 7 shows to be formed with a flange 77a and a notch 77b, secures the disk 74 rotatably to the supporting wall 12, in cooperation with a C-clip 78 which clasps the notch 77b, and a bushing 79 which fits in a suitable bore formed in the wall 12. However, the circular cam track 74a is slightly eccentric with respect to the axis of rotation of the plate 74, so that as the latter is rotated it displaces the cam-follower pin 76 to effect the desired adjustment of plate 70 and the counter-roller assembly 60–68. The bushing 79 is formed with an asymmetrical flange 79a, the longer part of which extends downwardly and serves, in cooperation with the flange 77a and a plate 80, to space the disk 74 sufficiently far from the wall 12 to provide clearance for the plate 70 to fit therebetween. This flange 77a is secured against rotation by a bolt 81 fastening it to the wall 12. The plate 80 is marked with a scale 80a, while the disk 74 is marked with a pointer line 74b that cooperates therewith for adjusting the setting.

To assure that the effect of the friction inserts on document $D_1$ overcomes the opposing drag of the counter-rollers 60, there is provided, in addition to the differential between their coefficients of friction, a vacuum system which draws the document $D_1$ toward the removal roller friction inserts 94 and away from the counter-rollers 60. This system includes a tubular chamber 100, seen in FIG. 3, bored in one side of the stationary spindle 86. As seen in this view and in FIG. 2 as well, suction is applied to this chamber 100 by a connecting pipe 102 the illustrated end of which communicates with the chamber, and the other end of which is connected to any conventional source of suction (not shown). The vacuum thus created is transmitted from chamber 100 to an annular groove 104 also formed in the spindle 86, which communicates with the chamber 100 at one side of the spindle and continues around to the other side. The tightly fitting bushing 87 is seated directly over this groove 104 to make it in effect a sealed annular conduit within the spindle 86. The bushing has openings, however, at two locations seen at 106 in FIG. 3. FIG. 2 discloses that these openings 106 are located adjacent to the document-removal station, and also that the openings extend a short arcuate distance about the circumference of the bushing 87. The enlarged view of FIG. 6 serves best to show that the openings 106 are positioned in alignment with the path of rotation of two rows of bores 108 which extend entirely through from the interior of sleeve 84 to the exterior of the two middle removal rollers 82 and their friction inserts 94. Each row of bores 108 is seen in FIGS. 2 and 5 to be spaced circumferentially about the arc-segment occupied by these friction inserts 94, FIG. 2 further showing that there are five such bores per insert. From FIGS. 2 and 6 it is seen that as each friction insert 94 passes the document-removal station, the bores 108 thereof communicate, for a small portion of their arcuate travel, with the opening 106 to transmit suction to the exterior of the friction inserts 94. This results in the outermost document $D_1$ being drawn against the friction inserts 94 and away from the succeeding documents $D_2$ etc., and from the reverse-dragging counter-rollers 60, so that the downward drag of the friction inserts 94 prevails on the document $D_1$, and so that the latter is more reliably separated from the succeeding documents. As soon as one document is stripped away and the thickness of the stack is thereby reduced, the pusher plate 22 moves up, compensating for the reduced stack thickness and always keeping the outermost document pressed against the wall 16, gate 50 and removal rollers 82. Thus, the separation and removal process is cyclically repeated, one for each successive document as it comes to the outermost position $D_1$ and is engaged by a battery of friction inserts 94.

The point of tangency between the removal rollers 82 and the documents D is located down in the corner of the hopper 14. Therefore if any document were caught in the stack with its lower edge spaced above the stock boundary, as defined by the lower edges of the other documents, then the document which is thus out of registry might not be engaged by the friction inserts 94 and consequently might not be properly removed. In order to forestall this, prior to being placed in the document-feeder the sack of documents D is customarily placed in a conventional vibrator which shakes the stack so that the documents therein settle into mutual registry. However, since an occasional document may nevertheless remain out of registry, there are provided two polygonal register rollers 110, seen in FIGS. 1, 2, and 5, mounted in tandem upon a rotatable shaft 112 located outside the hopper 14 and journaled on the frame 12. FIG. 5 shows that the hopper wall 16 is formed with an access opening 16b through which, as seen in FIG. 2, the vertices of the register rollers 110 protrude to engage the outer face of the outermost document $D_1$. The respective vertices of the two rollers 110 are in horizontal alignment so that as the rollers rotate they strike the documents D in synchronism. These rollers 110 are driven clockwise (as seen in FIGS. 1 and 2) at a relatively high angular velocity in comparison to the removal rollers 82, so that several times between successive document removals a pair of roller vertices strikes whichever document is then in the $D_1$ position and, if it is above a position of registry with the stack, drags it quickly down until its lower edge reaches the corner member 52. Because of the polygonal shape of rollers 110 and their rapid rotation, they also produce a stack-vibrating action which works to settle all the documents D into registry, just as in a vibrator. The pusher plate 22 keeps the documents pressed against the rollers 110 throughout operation of the document-feeder.

In order to further insure the successful separation of successive documents $D_1$, $D_2$, etc., the removal rollers 82 are rotated slowly enough so that the linear speed at which the friction inserts 94 sweep through the document-removal station is kept relatively low. This maximizes the chance that on each successive document-removal cycle the document in the $D_1$ position will shear cleanly from the next succeeding documents in the positions $D_2$ etc., and it also provides gentler treatment for the documents D.

Ordinarily this low speed would have two disadvantages: It would feed all the successive documents $D_1$, $D_2$, etc. at a low document-sorting speed. And in addition, it would means htat one of the longer documents D (see FIG. 1) would not clear the document-removal station defined by rollers 82 before the beginning of the next document-removal cycle; i.e. the trailing edge of such a document would not pass the document-removal station by the time the removal rollers 82 have made a half revolution, which is the interval between operating cycles thereof. Thus on the next operating cycle the next battery of inserts 94 would operate on the trailing portion of the same document. Since this document would already have been started on its way out of the hopper 14 on the preceding cycle, this cycle would be wasted on this document, and removal of the next document could not begin until the following cycle. The result would be to render every second document-removal cycle ineffective, and thus halve the number of documents removed in a given time.

To forestall these results there are provided rollers 120 and 122 which, as seen FIGS. 1 and 2, protrude between the rails 97 and 98 respectively to meet within the feed path 96. Three spaced-apart acceleration rollers 120, of which only one is visible in the drawings, are nested in the spaces between adjacent removal rollers 82 and fixed on a shaft 124 which in turn is journaled on the frame 12. These acceleration rollers 120 are rotated (clockwise as seen in the drawings) at high speeds. There are three spaced-apart idler rollers 122 (only one of which is seen in the drawings), each positioned to be tangent to a respective one of the three acceleration rollers 120 so as to rotate therewith. The idler rollers 122 are rotatably mounted on a shaft 128 which is carried on the upper ends of four rocker arms 130 (only one of which is visible in the drawings). As seen in FIG. 1, the rocker arms 130 are pivotally mounted at their midsections by a pin 132 which passes through three partitions 134 (noly one of which is visible in the drawings) which are integral extensions of a block 136 projecting horizontally from the wall 12 and secured thereto. Tension springs 140 (of which only one is visible in FIG. 1) are connected to the lower ends of the rocker arms 130 in order to bias the idler rollers 122 into tangency with their respective acceleration rollers 120. The other ends of springs 140 pass through bores in the block 136, and are anchored to the block by means of bolt and nut assemblies 144 (only one of which is visible in FIG. 1) which can be adjusted to vary the spring tension.

As each document D is delivered at a relatively low speed along the feed path 96, the leading edge of the document travels just a short distance before it reaches an acceleration station defined by the place of tangency of the rollers 120 and 122. It is then gripped between these rollers and rapidly accelerated along the remaining length of the path 96 and on to its destination, which may be a document-sorter unit. The speed of the acceleration rollers 120 is sufficiently high so that each document is delivered to the document-sorter at a speed adapted for rapid document-sorting. The speed is also sufficiently high so that, even if the length of the document is as great as the maximum that this document-feeder is expected to handle, the trailing edge of the document passes the document-removal station before the removal rollers 82 have completed a half revolution, to bring the next battery of inserts 94 up to the document-removal station and thus begin the document-engagement phase of the next cycle. As a result, it will be the next document, and not the trailing portion of the present one, which will be thus engaged.

In speaking of relatively low and high speeds throughout this specification and the appended claims, we do not mean to indicate particular speeds, but only to indicate that they are low or high in relation to each other. We now turn to a description of the drive means for the various rollers already described wherein it will be seen that this document-feeder may be run at any desired overall speed, but the ratio of the speed of the removal rollers 82 to that of the acceleration rollers 120 is a constant determined by the geometry of the apparatus. Referring to FIG. 8 we see that in a shelf 150 behind the supporting wall 12 there is a motor 152 having a drive shaft 154, and a pulley 156 is secured thereto to drive a belt 158. Power is transmitted from this belt by means of a pulley 162 to a take-off shaft 160 journaled in the supporting wall 12. By a suitable choice of motor speeds and of the relationship between the diameters of pulleys 156 and 162, the take-off shaft 160 can be driven at any desired speed. Two further pulleys 164 and 166 are secured to the shaft 160 for taking power therefrom. The former has a relatively large diameter, and drives a belt 168 which in turn drives a relatively small-diameter pulley 170 secured to the acceleration roller drive shaft 124. From the geometry of this arrangement it is clear that the latter shaft will run considerably faster than the take-off shaft 160. The pulley 166, on the other hand, drives, by means of a belt 172, a pulley 174 the same size as itself, which is secured to the removal roller shaft 90. Therefore, the latter shaft will run at the same speed as the take-off shaft 160, or considerably slower than the acceleration roller shaft 124. The relationship between the final surface speeds of the acceleration roller 120 and removal rollers 82 depends further upon the relationship of the diameter of these rollers to those of their respective drive pulleys 170 and 174. As long as each of these rollers bears generally the same relationship to its respective drive pulley, e.g. having a diameter larger by approximately the same proportion, then the speed differential is preserved and the surface speed of the acceleration rollers 120 is necessarily considerably higher than the removal rollers 82. A satisfactory ratio of such surface speeds has been found to be approximately 1.5:1, although lower or higher ratios might be employed, depending upon the maximum length of the documents which the machine is expected to handle.

Figure 9:
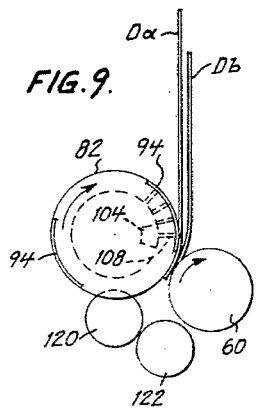
Figure 10:
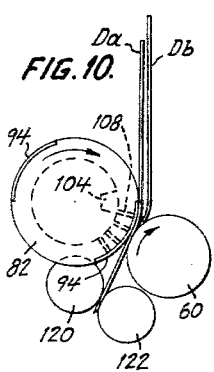
Figure 11:
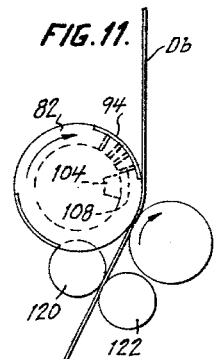
Figure 12:
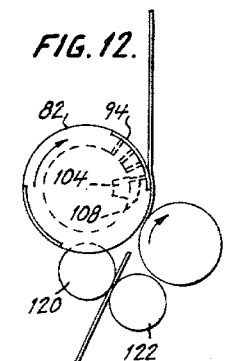

As a result of this differential in surface speed between the removal rollers 82 and the acceleration rollers 120, a small part of the length of each document (equal to the distance from the removal station to the acceleration station) will initially pass the removal station relatively slowly, but its remaining length will pass through about 1½ times as fast. Therefore (within certain limits), even extra long documents will pass the removal station within one cycle's time. This is best illustrated by the sequence of schematic diagrams of FIGS. 9–12 representing successive phases of a typical document-feeder cycle. In FIG. 9 the cycle is beginning. An extra-long document $D_a$ first in line is being contacted by one set of inserts 94, and the first of the bores 108 have reached the openings 104 and have begun to draw vacuum therefrom, so that the first document $D_a$ is drawn downwardly. Meanwhile, the counter-rollers 60 hold back the normal-sized next document $D_b$. In FIG. 10 separation of successive documents $D_a$ and $D_b$ is well advanced. The first document $D_a$ is well down the feed path and has begun to be accelerated by the rollers 120 and 122, the last of the bores 108 are about to pass the opening 104 and cease drawing vacuum therefrom, and the inserts 94 are about to disengage from the first document $D_a$. In FIG. 11 the effect of the acceleration is clearly seen. The first document $D_a$ has rapidly gone much farther down the feed path and, in spite of its extra length, the trailing edge thereof has passed the removal station, even though the next cycle has not yet begun because the next set of inserts 94 has not yet engaged the second document $D_b$, nor have the first of its associated bores 108 reached the openings 104. Shortly thereafter, as seen in FIG. 12, these events do take place to start the document engagement phase of the cycle which will remove the second document $D_b$, but by that time the first document $D_a$ has been accelerated even further down the feed path by rollers 120 and 122. A document of any shorter length than $D_a$ (such as $D_b$ in FIGS. 9–12) is handled in the same manner and with equal facility, the only difference being that it clears the removal station with even more time to spare before the beginning of the next cycle. Thus this document-feeder operates independently of document length, up to a selected maximum length.

Referring again to FIG. 8, it is seen that the belt 172 drives another pulley 176 which is secured to the counter-roller shaft 64. The pulley 176 is so located in relation to the pulleys 166 and 174 that the belt 172 passes over only a small arc of its circumference. Small movements of the counter-roller shaft 64, as the counter-rollers 60 are adjusted, do not significantly affect the driving engagement between the pulley 176 and belt 172, but merely affect the tension of the latter.

Completing the drive train is a take-off pulley 178 which is secured to the removal roller shaft 90 and drives a belt 180 that passes over a pulley 182 driving the register roller shaft 112. It will be seen that the register roller drive pulley 182 is sufficiently smaller than its take-off pulley 178 so that the register rollers 110 rotate considerably faster than the removal rollers 82; for example, at least twice as fast. In this manner several of the register roller vertices can effect a registering action between successive removal operations even though there is one removal cycle for every half revolution of the removal rollers 82.

In operation, the mechanism so far described is kept running continuously, so that the documents D continue to be picked from the stack as long as any are present and able to contact the removal rollers 82. In accordance with this invention, the feeding of documents D is halted only by interrupting such contact. Then when feeding is resumed the documents can be delivered at full speed from the start, because it is not necessary to first accelerate the drive train and removal mechanism. The gate 50 is the member which interrupts the feeding operation even though the removal rollers 82 continue to rotate. In order to accomplish this the shaft 49, to which the gate 50 is secured, is rotated until the gate 50 so far closes off the exit opening 54 between the gate 50 and the counter-rollers 60 that the documents D can no longer leave the hopper 14. Further, this position of the gate 50 has the effect of deflecting all the documents $D_1$, $D_2$, etc. out of contact with the removal rollers 82 so that the latter no longer act thereon, and deflecting them toward the counter-rollers 60, so that their restraining effect not only goes unopposed by the removal rollers 82 but is intensified as well. As seen in FIGS. 3–5 and 8, the gate 50 is biased to this closed position by a link 200, which is secured to the shaft 49 behind the supporting wall 12, and a tension spring 202 which is connected between the lower end of the link 200 and a block 204 secured to the supporting wall 12, the spring being anchored within a bore of the block 204 by a bolt and nut assembly 206, which also serves to adjust the spring tension. Connected to the upper end of link 200 is the armature 208 of a solenoid 210 secured to the rear of the supporting wall 12 by a rectangular bracket 212. When the operator wishes to feed documents, the solenoid 210 is energized, whereupon the armature 208 thereof is retracted into the solenoid, thus rotating link 200, shaft 49, and gate 50 so that the latter so far widens the exit opening 54 that a document can pass, and the first document $D_1$ is no longer deflected away from the removal rollers 82 or toward the counter-rollers 60.

While the feed is interrupted it is advisable to also interrupt the action of the register rollers 110, otherwise they would continue to exert a downward force on document $D_1$ until the latter crumpled because of its inability to continue downwardly through the then closed exit opening 54. Accordingly, there is provided a mechanism which disengages all the documents D from the register rollers 110. As best seen in FIGS. 1 and 2, this includes a scythe-shaped interposer 250 pivotally carried upon a pin 252 which in turn is mounted on the supporting wall 12. A tension spring 254 is connected between the short lower end of the interposer 250 and a block 256 secured to the supporting wall 12, the tension spring 254 being adjustably secured within a bore in the block 256 by a nut and bolt assembly 258. The tension of the spring 254 biases the interposer 250 clockwise toward the position seen in FIGS. 1 and 5, wherein it nests between and circles above and around the polygonal register rollers 110, projecting further into the hopper 14 through the access opening 16b than the vertices thereof, so that the document $D_1$ and all those behind it are pushed back therefrom. This position therefore interrupts the operative effect of the register rollers 110 during a luil in operation. To resume feeding, the interposer 250 is retracted by a link 260 actuated by the armature 262 of a solenoid 264 which is secured by means of a bracket 266 to the supporting wall 12. As is best seen in FIG. 5, a narrow upward extension 16c of the access opening 16b is provided to allow clearance for the scythe-like arm of the interposer 250 as it moves through its arc during interposition and retraction. The solenoids 264 and 210 are connected to a suitable power supply designed to energize and de-energize both solenoids together so that their stop and start functions are synchronized.

The novel means taught herein for interrupting the feed has advantages over previously known mechanisms, particularly in that it can be controlled so precisely as to permit the feeding of a single document, or any definite number of documents, at a time. (Even in such a case, each such document is delivered at full speed.) This is especially useful, for example, when it is desired that after leaving the document-feeder the successive documents $D_1$, $D_2$, etc. be sorted to different destinations, and the sorter employed is slower than this high speed document-feeder. In such circumstances the documents are fed one at a time, the feed being interrupted momentarily each time thereafter, so that the document-feeder is allowed time to switch between the different destinations desired. It is possible to interrupt the feed without the use of the gate 50, for example by merely disengaging the register rollers 110 from the documents D and shutting off the suction supplied to the connecting pipe 102. But that expedient does not achieve the precision possible with this document-feeder, because one or more additional documents D, which are already started downwardly by the register rollers 110 prior to disengagement thereof, are likely to continue on out through the exit opening 54 under the influence of the removal rollers 82 (which continue to rotate at full speed), especially during the time it takes for the suction force to gradually taper off. Therefore, unless a positive shut-off action is supplied, as by the gate 50 in accordance with this invention, it is difficult to stop the flow immediately, i.e. without releasing any further documents, as is necessary for feeding one document, or any definite number of documents, at a time.

Such precise control is achieved by providing a one-pulse energizing circuit for the solenoids 210 and 264. An illustrative circuit is shown schematically in FIG. 13, which shows a positive bus 270 and a ground bus 272 across which is impressed a steady voltage. The actuating solenoids 210 and 264 are connected in parallel across this energizing circuit. One side of the parallel solenoid combination is connected directly to the ground bus 272, while the other side can be connected to the positive bus 270 by means of a control network which includes a plurality of switches, relays, and cam-operated contacts. Each of the relays includes a coil and a plurality of switches which the coil operates. The operative associations are indicated in FIG. 13 by the use of the same reference numeral with appropriate letter postscripts; e.g. relay coil 274 operates switches 274a, b, and c. Some of the relay-operated switches can also be actuated manually by the operator of the machine, as will appear below. All illustrated switching components are biased to one operating position (e.g. normally open or closed), and are illustrated in their biased or normal position in FIG. 13.

Energization of the feed-controlling solenoids 210 and 264 is ultimately effected by a solenoid control switch 274a which in turn is controlled by an actuating relay 274. For single feed operation, the energizing circuit of the actuating relay 274 is partially completed by manually operating a single feed actuating relay switch 276. Thereafter, control is taken over by two pairs of cam-operated actuating relay contacts 278a and 280a, the timing of which is shown in FIG. 14.

These contacts are operated by respective cam wheels 278 and 280 located on the take-off shaft 160 (FIG. 8). As noted previously, the driving relationship between the take-off shaft 160 and the removal roller shaft 90 is such that these rotate at the same speed. Therefore the cam wheels 278 and 280 rotate at the same speed as the removal rollers 82, so that contacts 278a and 280a are operated in synchronism with the removal rollers. Since the removal rollers 82 perform two document removal cycles per machine revolution, the cam wheels 278 and 280 are each provided with two cam rises 180° apart so that the actuating relay contacts 278a and 280a also undergo two operating cycles per machine cycle.

After the single feed switch 276 has been operated, the very next closing of the actuating relay contacts 278a and 280a causes the actuating relay 274 to be energized. The first consequence of this is that the solenoid control switch 274a is closed, to energize the solenoids 210 and 264 so that the feeding of one document can then take place. Another consequence is that an actuating relay holding switch 274b is closed to keep the actuating relay 274 energized.

A third consequence is that the actuating relay 274 closes a switch 274c to energize a disabling relay 282 which gives the circuit its one-shot, or non-repeating characteristic. This relay 282 opens a disabling switch 282a, thus opening the initiating circuit of the actuating relay 274. The disabling relay 282 also closes a disabling relay holding switch 282b so that it continues its own energization to perpetuate the action of the disabling switch 282a. Because of the actuating relay holding switch 274b, opening of the disabling switch 282a has no effect on the energization of the actuating relay 274 then in progress. But with the disabling switch 282a open, it now is impossible to re-initiate actuating relay (274) energization. Therefore, as soon as the actuating relay contacts 278a and 280a open (see FIG. 14) to de-energize actuating relay 274, it remains de-energized even if the single feed switch 275 is still being manually held. The timing of the actuating relay contacts 280a is such that they remain closed for only the time that it takes to remove one document. Therefore, after that document has been removed and the actuating relay contacts 280a have opened, the actuating relay 274 remains turned off, and no further feeding of documents takes place. The actuating relay 274 is re-enabled only when a reset operation is performed. This consists of manually opening a disabling relay shut-off switch 284, which de-energizes the disabling relay 282 to close the disabling switch 282a and thereby terminate the disabling action. Thereafter, the single feed switch 276 can again be operated to feed a document. The closing of the disabling relay energizing switch 274c as described above turns on an indicator light 286 to show that the disabling relay shut-off switch 284 can be operated to reset the single feed mechanism.

Taking advantage of the fact that this machine performs two document removal cycles for every machine revolution, there is a way to operate the illustrated circuit for alternate feed of documents, i.e. feeding of one document each machine cycle instead of each removal cycle. For this type of operation an alternate feed switch 288a is manually operated to energize an alternate feed relay 288. This in turn has two consequences. First, an alternate feed actuating relay switch 288b is operated to partially complete the circuit of the actuating relay 274. Thereafter, the actuating relay contacts 278a and 280a control energization of the actuating relay 274. The second consequence of energizing the alternate feed relay 288 is that the alternate feed switch 288a, which was originally manually operated, is held by the alternate feed relay 288 to keep itself energized and thereby to keep the alternate feed actuating relay switch 288b in position.

The next time the actuating relay contacts 278a and 280a close, the actuating relay 274 is energized. As a result, the solenoid control switch 274a is closed and a document is fed. The actuating relay holding switch 274b is also closed, as previously described. As also previously described, the disabling relay energizing switch 274c is closed. However, the alternate feed switch 288a is now in the position to energize the alternate feed relay 288 instead of the disabling relay 282. Therefore, during alternate feed operation, energization of the disabling relay 282 is controlled by a set of cam-operated alternate feed disabling relay contacts 290a. These contacts are operated by a third cam wheel 290 (FIG. 8) similarly located on the take-off shaft 160 and synchronized with the removal rollers 82. However, this wheel 290 has only one came rise; therefore it operates the disabling relay contacts 290a only once every machine cycle; i.e. on every alternate document-removal cycle instead of every consecutive document-removal cycle. The timing of these cam operated contacts 290a is also shown in FIG. 14. There the 360° interval marked off represents one full machine cycle, which includes two document-removal cycles: 0 to 180° and 180 to 360°. Let us assume that the alternate feed document-removal cycle now being described occurs from 180 to 360°. During this removal cycle a document is fed. But the disabling relay contacts 290a remain closed. Consequently, when the disabling relay energizing switch 274c is closed during this removal cycle the disabling relay 282 is energized. Because of its holding switch 282b, it then remains energized during the next removal cycle. Therefore during the following 0 to 180° interval actuating relay energization cannot be initiated and no document is fed. But also during that interval the disabling relay contacts 290a are re-opened. As a result, the disabling relay 282 is de-energized, the disabling switch 282a is closed, and therefore on the following removal cycle it is again possible to energize the actuating relay 274 to feed a document. An indicator light 292 shunted across the alternate feed relay 288 goes on when that relay is energized to indicate that alternate feed operation is in progress. Alternate feed can be terminated by manually opening an alternate feed relay shut-off switch 294. Another indicator light 296 also shunted across the alternate feed relay 288 indicates that the alternate feed shut-off switch 294 can be operated to terminate alternate feed operation. This alternate feed capability can be of importance in cases where it is desired to slow down the document feed rate to keep pace with slower components in a data-processing installation.

To operate this circuit for continuous feed, a continuous feed switch 298a is manually closed. This energizes a continous feed relay 298 which in turn holds closed the switch 298a (originally manually operated) to keep itself energized. It also closes a continous feed actuating relay switch 298b, which partially completes the circuit of the actuating relay 274 and places energization thereof under the control of the actuating relay contacts 278a. The first time these contacts close (see FIG. 14) the actuating relay 274 is energized, and thereafter the holding switch 274b keeps it energized. This situation continues until a continuous feed shut-off switch 300 is manually opened. An indicator light 302 is connected to be energized by the continuous feed switch 298a to indicate that continuous feed operation is going on.

The purpose of having two pairs of actuating relay contacts 278a and 280a in series is as follows: One pair of contacts 278a with a short operating time (see FIG. 14) is required to assure that after a certain point in the removal cycle no document-removal operation can be initiated. Otherwise there might not be time to complete the operation before the end of the removal cycle, and this could result in imprecise feeding. Thus the function of the contacts 278a during an abortive starting cycle is to open after the last instant for starting. But during a removal cycle when document-removal operation is started in good time or has been in progress (alternate or continuous feed), this early opening of the contacts 278a is nullified by the fact that the actuating relay 274 (which under the stated assumption is now energized) keeps its holding switch 274b closed to shunt the contacts 278a. Then the holding switch 274b remains closed and the actuating relay 274 energized until the circuit is broken at another location by the eventual opening of the other actuating relay contacts 280a. Thus the function of these contacts is to establish the length of time that document-removal operation continues during each removal cycle. These contacts 280a also stay closed a long enough time so that if the alternate or continuous feed shut-off switch 294 or 300 is operated in the middle of a particular document-removal operation, that operation continues to completion before the shut-off instruction takes effect. Similarly in the case of single feed, the disabling relay 282 is turned on early in the removal cycle, but only takes effect after the actuating relay 274 is turned off by the opening of the contacts 280a as described above. Thus precision of operation is not impaired by having a document stop in the middle of its removal progress.

In the circuit of FIG. 13 a diode and resistor combination 304 is connected as shown across the solenoid and relay coils to prevent inductive kickback when the coils are de-energized. The various impedances 306 in the circuit are for the purpose of establishing desired voltage levels. If desired, the shut-off switches, 284, 294, and 300 can be ganged as indicated by the dashed line 308.

In accordance with another embodiment of this invention, FIGS. 15 and 16 illustrate an alternative type of gate and interposer mechanism which has certain further advantages. In describing this alternative mechanism, which is to be installed in a document-feeder otherwise identical with the one just discussed, reference numerals are used which are in the three hundred range and have the same last two digits as those in the tens range used for corresponding members of the previously described embodiment. Thus, there is seen in profile one of a set of counter-rollers 360, one tine of a forked corner member 352, and one of a set of removal rollers 382, all identical in structure and function to their previously described counterparts. But in this embodiment, as seen in the sectional view of FIG. 15, the surface of the sleeve 384, on which the removal rollers 382 are mounted, is formed with a cam track in the space between two of the removal rollers. Each half of this cam track includes a rise 384a and a dwell 384b. The gate 350, like its previously described counterpart, is pivoted by means of a shaft 349 to the depending ears 316a of the hopper wall 316. In this embodiment, however, the shaft 349 is not actuated by a solenoid. Instead, motion of the gate 350 is controlled by a cam-follower wheel 400 which is rotatably mounted on the gate 350 by a stub shaft 402 for tracking the cam surfaces 384a, 384b. Bolted to a thickened section 316d of the hopper wall 316 is an extension finger 404 which serves to anchor a return spring 406 for the cam-operated gate 350. The upper end of the spring 406 is adjustably tensioned by a bolt and lock nut assembly 408 threaded in a tapped bore of the extension finger 404, while the lower end is connected to a pin 410 on the gate 350, so that the spring 406 retracts or opens the gate 350 when one of the cam dwells 384b permits, yielding, however, when one of the rises 384a thrusts the gate into the closed position. Because the cam surfaces 384a, 384b are on the sleeve 384 of the removal rollers 382, proper location thereof automatically synchronizes the action of the gate 350 with that of the removal rollers. The gate opens and closes for each individual document-removal operation while removal is in progress, instead of only during a halt in operation as in the previous embodiment.

This individual closing type of action gives superior document-separation results because when an occasional double occurs, that is, when two documents are picked together during the same cycle, the amount of slippage between them, although not sufficient to cause complete separation, does cause the document which is later in stack order to fall somewhat behind the one which is first. Then when the gate 350 clamps down, it will trap the second document in the likely event that the latter has not yet cleared the hopper 314, thus separating it from the first document which has already cleared the hopper and therefore will go on along. In other words, the same positive shut-off action provided by the previously described gate 50 to halt the feed after some precise number of documents, is here used after each removal cycle to help insure that precisely one document is fed per removal cycle.

Additional advantages arise from the fact that the closing of the gate 350 is powered by the cam 384a, 384b rather than by the previously described solenoid 210. Since it presents certain design difficulties to provide a solenoid which is both fast-acting and powerful, there may have to be some compromise between the speed and force of the gate-closing operation. But such a compromise is undesirable, since both fast closing and firm action contribute to precision control of the feed. In this embodiment the cam mechanism can provide any desired degree of both speed and closing force, since rapid closing can be achieved by providing a steep rise between cam sections 384a and 384b, while ample force can be easily supplied by the document-feeder drive which rotates the sleeve 384. The result of this faster and firmer closing action is still more precision in shutting off the flow of documents. Moreover, as the overall speed of the document-feeder is increased, a solenoid eventually approaches a minimum response time which then becomes a limiting factor for the entire device. The cam-operated mechanism, on the other hand, will automatically operate at what ever speed is dictated by the overall document-feeder drive.

In the sectional view of FIG. 16, which is taken along a plane displaced from that of FIG. 15, it is seen that there is provided a hardened insert 420 bolted to the rear of the gate 350 to serve as a catch for a chock 422. It is also seen that the access opening 316b is formed in the thickened section 316d and is not fully enclosed like the previously described access opening 16, but instead extends downwardly to the lower edge of the hopper wall 316. As a result, a shaft 424, to which the chock 422 is secured, can be journaled in the side wall of the access opening 316b, with the chock 422 having an open space therebelow through which it depends to engage the gate insert 420. In the position indicated by its full-line representation, the chock 422 catches the upper surface of the insert 420 to lock the gate 350 in the closed position illustrated in the drawings. This means that during cam dwell phases, the follower wheel 400 is held off the surface 384b, against the urging of the return spring 406. Thus, in order to halt operations for an extended interval, the shaft 424 can be rotated counterclockwise to bring the chock 422 into the locking position. When the shaft 424 is later rotated clockwise, the chock 422 is retracted to the position indicated by its broken-line representation. It is then clear of the insert 420, and the gate 350 is again free to open once each cycle under the influence of the return spring 406 as the follower wheel 400 tracks the cam dwells 384b, thus resuming the feeding of documents. Control over document-feeding may be achieved by any conventional means (not shown) for operating the shaft 424, for example a solenoid and return spring arrangement (not shown) such as the previously described assembly 200-212 (seen in FIGS. 3-5) which is used to operate the gate shaft 49. It would be a simple matter to substitute this solenoid for the solenoids 210 and 264 in the circuit of FIG. 13. In such case a solenoid is still used for the operation of the gate 350. But the advantage resides in the fact that such solenoid is not required to provide the full gate-closing force. It need only supply the much weaker force necessary to keep the return spring 406 extended. When thus freed from large force requirements, the solenoid can be selected primarily for fast response, so that document-feeder operation can be halted with more precision.

Moreover, this is the only solenoid needed, so that a saving of a solenoid (and other components) can be achieved, in accordance with further features of this embodiment. FIG. 16 uses reference numerals in the five hundred range having the same last two digits as those in the one and two hundred range used for corresponding members in the previously described embodiment. There is seen an interposer 550 which is pivotally mounted upon a stub shaft 552 set in the side wall of the access opening 316b. A curved arm of the interposer 550 extends upwardly alongside a polygonal register roller 510 which is driven (by drive means such as previously described in connection with shaft 112) through a shaft 512 also journaled in the side wall of the access opening 316b. In the position shown in FIG. 16, the upper arm of the interposer 550 is so disposed that it curves forwardly of the foremost-projecting position that can be attained by a vertex of the register roller 510, so as to hold the documents which are in the hopper 314 out of engagement with the register roller. The other end of the interposer 550 extends downwardly and carries a connecting pin 430. For connection thereto the gate 350 extends upwardly and terminates in a fork 350a which embraces the connecting pin 430. In this manner the movements of the gate 350 and interposer 550 about their respective pivots 349 and 552 are tied together. FIG. 16 shows that the closed position of the gate 350 is associated with the interposed position of the interposer 550; and in like manner when the gate 350 is moved to and from its open position, the interposer 550 must be retracted and then re-interposed conjointly therewith. Thus, effective operation of the register roller 510 is initiated and terminated in synchronism with that of the removal rollers 382, but no additional solenoids or other components are required for the interposer 550 alone.

It will now be realized that the improvements disclosed herein make it possible to construct a document-feeder with numerous advantages. For example, a document-feeder in accordance with this invention has been operated at speeds of over four thousand documents per minute, yet even at such speeds has achieved reliable document separation and a reduced risk of document damage. Further, a document-feeder in accordance with this invention provides very precise control over the flow of documents, and can be stopped after delivering a definite number of documents, even as few as one document, yet each such document is delivered at full speed. In addition, it will be appreciated that the mechanism described herein is uncomplicated and durable, and therefore economical to manufacture and maintain.

What has been described is a preferred embodiment and is believed to be the best mode of practicing the invention, but it will be clear to those skilled in the art that modifications may be made therein without departing from the principles of the invention. Accordingly this description is intended just as an example, the scope of the invention being stated in the appended claims.

We claim:
1. A document-feeder comprising:
(I) a document hopper;
(II) restraining means positioned to be adjacent an edge of a document in the hopper;
(III) a wall positioned to be adjacent a face of a document in the hopper;
(IV) the wall terminating short of the restraining means;
(V) and a gate—
(A) positioned adjacent the space between the wall and the restraining means,
(B) and cooperating with the restraining means to define an exit opening for the document therebetween;
(VI) the gate being mounted for movement to open and close the exit opening;
(VII) document-registering means positioned to protrude into the hopper for operative engagement with a document therein;
(VIII) an interposer positioned and arranged to be interposable to disengage the document from the registering means;
(IX) means mounting the interposer for movement from such interposed position to a retracted position to permit such engagement;
(X) and a mechanical linkage operatively connecting the interposer and the gate in such manner that closing of the gate is associated with interposing of the interposer, and opening of the gate is associated with retraction of the interposer.

2. The combination as defined in claim 1 wherein said document registering means includes means to cyclically remove successive documents from said hopper to a position juxtaposed said gate.

3. The combination as defined in claim 2 including a document removal roller positioned adjacent said gate and said exit opening for receiving and advancing documents removed by said document registering means.

4. The combination as defined in claim 3 including document accelerating rollers positioned below said restraining means and said document removal roller for accelerating documents away from said exit opening.

5. The combination as defined in claim 3 wherein said document registering means includes means for rotating said registering means at a peripheral velocity in excess of the peripheral velocity of said document removal rollers.

6. In a document feeder including means for supporting a stack of documents;
means for removing from the stack the outermost document thereof;
at least one counter-roller;
a wall positioned to be adjacent a face of a document in the stack;
the wall terminating short of said counter-roller;
a gate positioned adjacent the space between the wall and said counter-roller and cooperating with the counter-roller to define an exit opening for a document therebetween;
said gate being mounted for movement to open and close the exit opening;
document registering means positioned to protrude into the stack area for operative engagement with a document therein;
an interposer positioned and arranged to be operative to disengage documents from said registering means;
means mounting said interposer for movement from said operative position to a retracted position to permit such engagement;
a mechanical linkage operatively connecting the interposer and the gate in such a manner that closing of the gate is associated with the operative position of the interposer and opening of the gate is associated with the retraction of the interposer;
means rotatably mounting the counter-roller with its periphery thereof in position to engage an edge of a document in the stack in such a manner that rotation of the counter-roller in a selected direction creates a retardation on the document opposing its removal from the stack;
the counter-roller and means for removing from the stack being spaced from each other to provide a gap for the document to pass through on removal; and
said counter-roller mounting means including a shaft supporting the counter-roller, a carrier member supporting said shaft, a supporting member, means pivotably securing said carrier member to said supporting member, and adjusting means, means rotatably mounting the adjusting means on said supporting member, a cam track formed in the adjusting means and having a curved configuration eccentric with respect to the axis of rotation thereof, and cam following means connecting the carrier member to the adjusting means cam track in such a manner that rotation of the adjusting means pivots the carrier member to adjust the position of the counter-roller relative to said means for removing documents.

7. A document-feeder comprising:
(I) a document hopper;
(II) restraining means positioned to be adjacent the edge of documents in the hopper;
(III) a wall positioned to be adjacent a face of a document in the hopper;
(IV) the wall terminating short of the restraining means;
(V) a gate—
  (A) positioned adjacent the space between the wall and the restraining means;
  (B) and cooperating with the restraining means to define a document exit opening therebetween;
(VI) means for removing documents from the hopper through the exit opening; said means including document registering means positioned to protrude into the hopper for operative engagement with a document therein, an interposer positioned and arranged to be operable to disengage documents from said registering means, means mounting said interposer for movement from the operable position to a retracted position to permit such engagement, and a mechanical linkage operatively connecting the interposer and the gate in such a manner that closing of the gate is associated with operation of the interposer and opening of the gate is associated with retraction of the interposer;
(VII) and means arranged to move the gate to close off the exit opening whereby to prevent the removal of documents from the hopper, such means including—
  (A) a solenoid arranged to actuate the gate,
  (B) and a solenoid-energizing circuit including at least one switch, and arranged to provide single-pulse energization for the solenoid whereby to feed a limited number of documents upon a single operation of the switch.

8. A document-feeder according to claim 7, wherein the solenoid energizing circuit comprises:
(I) solenoid-controlling means;
(II) solenoid-disabling means;
(III) means responsive to the said switch for actuating both the solenoid-controlling and solenoid-disabling means;
(IV) and timing means for allowing the solenoid-controlling means to prevail for the time necessary to remove a limited number of documents, and the solenoid-disabling means to prevail thereafter.

9. A document-feeder according to claim 8, wherein:
(I) the solenoid-controlling means comprises a switch relay-operated to energize the solenoid;
(II) the actuating means comprises a relay coil for operating the solenoid-controlling switch;
(III) the solenoid-disabling means comprises—
  (A) another switch relay-operated to de-energize the actuating relay coil,
  (B) switching means selectively operable to route the initial energization circuit of the actuating relay through the disabling switch,
  (C) a disabling relay coil operating the disabling switch,
  (D) holding means to continue energization of the disabling relay coil,
  (E) and a disabling relay switch operable by the actuating relay coil to energize the disabling relay;
(IV) and the timing means comprises—
  (A) an actuating relay holding switch connected in parallel with the disabling switch and operable by the actuating relay to continue energization thereof,
  (B) and switching means responsive to the document-removing means to de-energize the actuating relay coil after the removal of a limited number of documents.

10. A document-feeder according to claim 8, further comprising:
alternate feed means selectively operable in response to the document-removal means to alternatively de-activate and re-activate the solenoid-disabling means on consecutive document-removal opportunities.

11. A document-feeder according to claim 8, further comprising:
continuous feed means including a switch connected in parallel with the disabling switch and selectively operable to enable actuating relay energization on consecutive document-removal opportunities.

References Cited in the file of this patent
UNITED STATES PATENTS

| | | |
|---|---|---|
| 2,880,996 | Stiles | Apr. 7, 1959 |
| 2,936,170 | Herrick et al. | May 10, 1960 |
| 2,970,537 | Wardwell et al. | Feb. 7, 1961 |
| 2,991,074 | Saltz et al. | July 4, 1961 |
| 3,034,784 | Lopez | May 15, 1962 |
| 3,052,465 | David | Sept. 4, 1962 |